Feb. 23, 1954     E. W. MILLER     2,669,907
WORK SUPPORT FOR LONG WORKPIECES WITH MACHINE TOOLS
Filed Nov. 20, 1947     2 Sheets-Sheet 2

Inventor
Edward W. Miller
by Wright, Brown, Quimby & May
Attys.

Patented Feb. 23, 1954

2,669,907

UNITED STATES PATENT OFFICE 2,669,907

WORK SUPPORT FOR LONG WORKPIECES WITH MACHINE TOOLS

Edward W. Miller, Springfield, Vt., assignor to The Fellows Gear Shaper Company, Springfield, Vt., a corporation of Vermont Application November 20, 1947, Serial No. 787,046

11 Claims. (Cl. 90—7)

The object of the present invention is to provide a simple and efficient means for holding and rotating long work pieces in operative relation for being acted on by the cutter of a machine tool. In the embodiment of the invention here illustrated the work holder has been designed particularly for combination with a planetary gear shaping machine of the kind disclosed in my U. S. Patent No. 2,644,368 issued July 7, 1953, in order to carry work pieces which are too long to be accommodated by the work holding means shown in that application. The principles and particulars of combining means with machines of that character therefore constitute an important part of the invention for which protection is here sought. But certain of the novel features herein disclosed are applicable, with or without equivalent modifications and adaptations, to machines of other types; and as to such features I desire generic protection for all the uses and combinations to which they may be applied.

The invention comprises therefore the combination of a work spindle, or its equivalent, with novel means for effecting engagement of long work pieces with such a spindle or the like, holding the work piece in alinement with the spindle and imparting rotation from the spindle to the work piece. It further comprises the combination of the foregoing with the turret of a planetary machine tool carrying the work spindle and with means for imparting movement in an orbit, corresponding to that of the spindle, to the means which cooperates with the work spindle in holding the work piece. It comprises also the combination of a cutting tool and operating means therefor with the precedently mentioned features, and auxiliary characteristics and structures hereinafter described in detail and pointed out in the appended claims.

The drawings furnished herewith illustrate one of the possible embodiments of the invention and therein—

Figure 1:
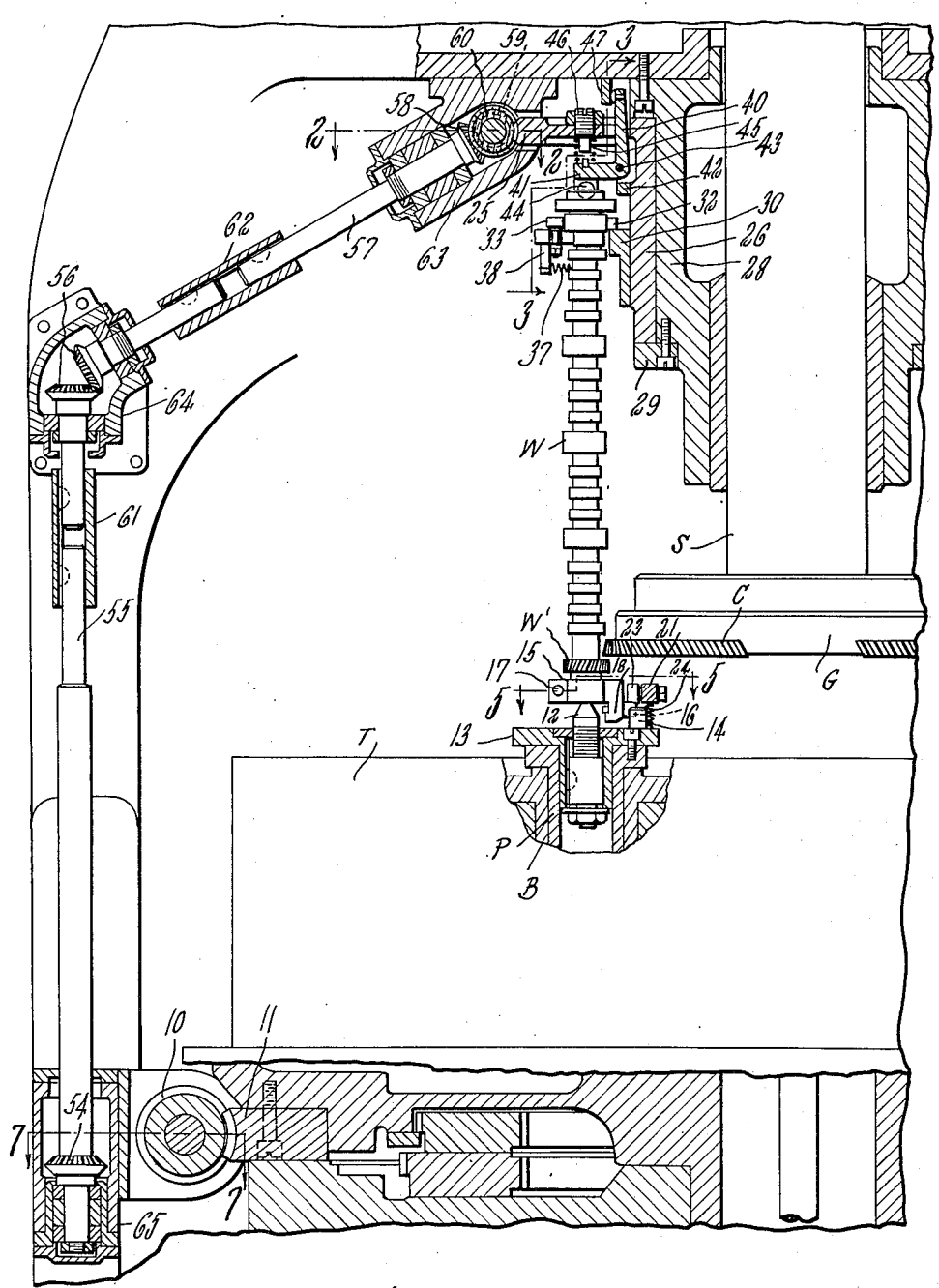
Fig. 1 is a partial vertical section of a planetary gear shaping machine such as that shown in my precedently identified patent application, together with additional means effective for connecting a long work piece with one of the work spindles of the machine and cooperating with the turret for imparting planetary revolution to the work piece.

All of Figs. 2–7 are drawn on a scale larger than that of Fig. 1.

Like reference characters designate the same parts wherever they occur in all the figures.

The herein illustrated embodiment of the invention is combined with a planetary gear shaping machine having a circular cutter C of large diameter attached coaxially to the lower end of a vertically reciprocable cutter spindle S, and a turret T rotatable about the axis of the cutter and cutter spindle, carrying a number of work spindles distributed around said axis with their own axes parallel thereto and being independently rotatable in the turret. The upper end portion of one of such work spindles designated P is shown in section in Fig. 1 as being rotatably mounted in a bearing B in the turret. The turret is rotated by a worm 10 meshing with a worm wheel 11 secured to the turret; the work spindles are independently rotated; and the cutter spindle is reciprocated and, if the cutter is provided with helical teeth for generating helical gears, it is given an oscillatory rotation about its axis in time with its reciprocating movements. The power sources and connections for so actuating the worm 10 and the spindles are not features of the present invention and are fully shown in my before named pending application. It may be noted, however, that the cutter C has a gap G at one side where there are no teeth and that finished work pieces are removed from each work spindle P and blank work pieces applied thereto when the spindle arrives beside the gap in the course of its planetary revolution.

The work piece is a long machine element designated W having adjacent to one end a flange or collar which is fashioned into a gear $W^1$ by operation of the cutter. One end of the work piece is engaged with a center 12 carried by an adapter 13 which is secured to the work spindle P. The work piece is rotated by a stud 14 carried by the adapter, and a driving dog 15 which is clamped on the work piece and carries a stud 16 extending into the path of rotation of stud 14.

Figure 5:
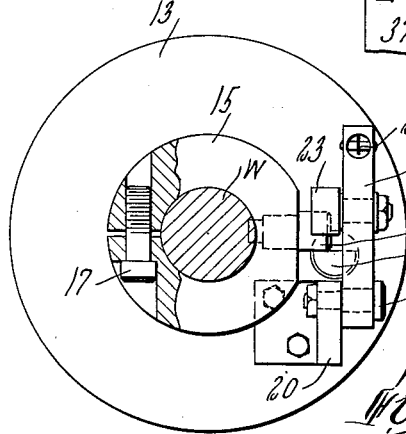
Fig. 5 is a sectional plan view taken on line 5—5 of Fig. 1.
Figure 6:
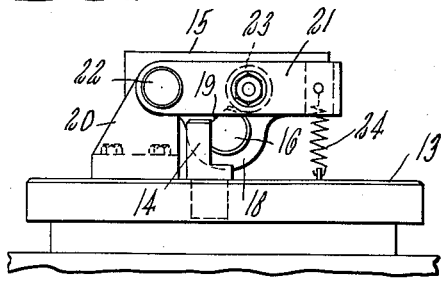
Fig. 6 is an elevation of the parts shown in Fig. 5 as seen from the right hand side of that figure.

The parts last described are shown in detail in Figs. 5 and 6. The dog 15 is a split collar which is clamped on the work piece by means of a screw 17. Stud 16 is mounted in a lug 18 on the under side of the dog 15 and projects laterally therefrom. It has a flattened side disposed to be engaged by a flattened side of stud 14, and an inclined wedge surface 19, all as shown in Fig. 6.

A bracket 20 is mounted on the adapter 13 adjacent to the stud 14 and carries an arm 21 which is connected to it by a pivot 22 and extends across and beyond stud 14. Arm 21 carries a roll 23 which is arranged to bear on the upper part of stud 16 at the opposite side of the center thereof from the side which bears on stud 14, and a spring 24, connected to the adapter and the outer end of arm 21, normally holds roll 23 against stud 16, but permits the roll to be displaced by the wedge surface 19 when stud 16 is passed under it from right to left, with respect to Fig. 6.

For securing the opposite end of the work piece, holding it in alinement with the work spindle P, and propelling it in an orbit corresponding to that of the work spindle, the following means are provided. A worm wheel 25 having a hub 26 is mounted to rotate on a sleeve 28 which contains the guideway and bearing for the cutter spindle S. It is supported by a retaining ring 29 secured to sleeve 28. A bracket 30 is secured to the worm wheel hub 26 and is formed with an open notch 31 (Fig. 4) into which the upper portion of the work piece can enter. On this bracket are mounted two centering rolls 32 in fixed positions at opposite sides of the notch 31 near the inner end thereof, which cooperate with a third roll 33 to engage the upper end of the work piece at three points distributed around the axis of the work spindle and center that part of the work piece. Centering roll 33 is carried by a lever 34 which is pivoted to the bracket 30 by a pivot pin 35 and is movable so as to place the roll in engagement with the work piece or at one side of the notch 31, as shown by dotted lines in Fig. 4. When in the latter (displaced or inoperative position), the lever is arrested by a stop 36.

A helical spring 37 is connected under tension to an anchor pin 38 projecting downward from the lever 34 and an anchor pin 39 projecting downward from the bracket 30, the spring being thereby located below the pivot 35 and adjacent to the axis of the pivot so that it is carried to one side or the other of that axis when the lever is swung into either the operative, work holding position or the inoperative position, and is effective to hold the lever in either position. The lever has a second arm 34a projecting to the opposite side of pivot 35 from the arm which carries roll 33, and located so as to be carried across the notch 31 when the roll 35 is in the inoperative position, and to lie beside the notch when the roll is in position to press on the work. By virtue of the design and proportions of this lever and the location of the anchor pins for its controlling spring 37, the work piece, when carried into the notch, displaces the lever arm 34a until the spring is brought into position for exerting force to press roll 33 against the work; and when the work piece is removed from the notch, it displaces the roll 33 far enough to cause location of spring 37 at the opposite side of the pivot axis, whereby it retains the lever against stop 36.

A bell crank lever having arms 40 and 41 is mounted above the upper end of the work piece by means of a bracket 42 secured to the worm wheel hub 26 and to which it is connected by a pivot 43. Arm 41 extends outward over the upper end of the work piece and carries contact rolls 44 disposed to bear on a flange $W^2$ of the work piece at diametrically opposite sides of the axis thereof. A spring 45 reacts between the lever arm 41 and an adjustable abutment 46 carried by the worm gear 25, normally pressing the rolls 44 against the work piece. The thrust of spring 45 is toward the work spindle P and the rolls 44 constitute hold-down rolls through which the work piece is retained in firm engagement with the center 12.

A cam element 47 is mounted on a stationary part of the machine structure and is provided with an inward protuberance located to displace the arm 40 of the bell crank lever toward the axis of the turret when the lever and work spindle are at the side of the cutter which contains the gap G.

Figure 2:
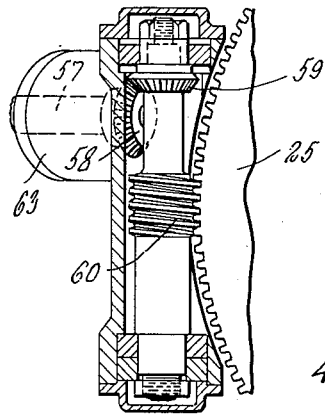
Fig. 2 is a fragmentary detailed section taken on line 2—2 of Fig. 1.
Figure 3:
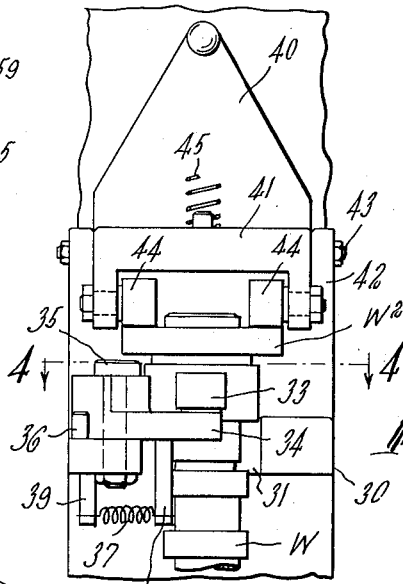
Fig. 3 is an elevation of the parts which appear at the right of the line 3—3 of Fig. 1.
Figure 4:
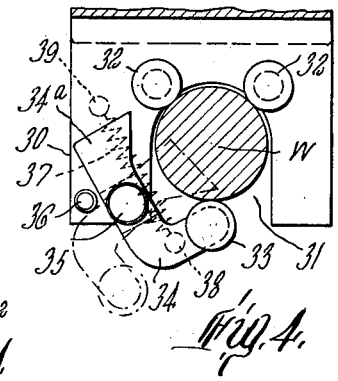
Fig. 4 is a sectional plan view on the line 4—4 of Fig. 3.
Figure 7:
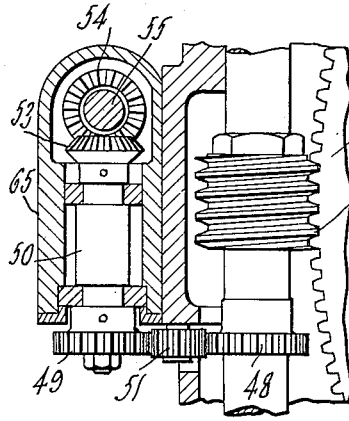
Fig. 7 is a fragmentary horizontal section taken on line 7—7 of Fig. 1.

The worm wheel 25 and work holding means carried thereby are rotated in unison with the turret T by a train of gearing and shafting shown in Figs. 1, 2 and 7. The shaft of worm 10, which rotates the turret, carries a gear 48 (Fig. 7) which drives a gear 49 on a jack shaft 50 through an idler 51. Shaft 50 carries a bevel gear 53 meshing with a gear 54 on an upright shaft 55, which, through a bevel gear pair 56, shaft 57 and bevel gear 58 drives a bevel gear 59 on the shaft of a worm 60 (Fig. 2) which drives worm gear 25. Shafts 55 and 57 are each made in two parts connected by coupling sleeves 61 and 62. One member of shaft 57, the gears 58 and 59 and the worm 60 are contained in a housing 63 secured to the machine frame structure contiguous to the worm wheel 25; the other section of shaft 57 and the bevel gears 56 are contained in a housing 64 secured to the frame structure, and the lower section of shaft 55 and gearing associated therewith are contained in a housing 65 mounted on the housing in which worm 10 is contained.

Prior to mounting a work piece in the machine, the dog 15 is secured to the end of the piece which is to be connected with the work spindle. Then, while the spindle is adjacent to the gap G of the cutter, the work piece is carried toward the spindle in an inclined position, with the dogged end forward and the stud 16 clear of roll 23, in counter-clockwise rotation from the position shown in Fig. 5, until the lower end of the work piece is engaged with center 12. The upper end of the work piece is then passed into the notch of the associated bracket 30 and is automatically centered and grasped by the stationary rolls 32 and retaining roll 33. The operator then turns the work piece clockwise until the stud 16 of the dog brings up against the driving stud 14 of the spindle. Before stud 16 reaches this position, its cam surface 19 rises and passes under roll 23, which roll is then caused by spring 24 to hold stud 16 against driving stud 14. When the work spindle is brought near the farther end of cutter gap G, cam 47 releases bell crank arm 40, and allows the hold-down rolls 44 to be pressed by spring 45 against the work piece. When the spindle reaches the cutter gap again, after making the circuit around the axis of the machine, the hold-down lever 40—41 is retracted by cam 47 and the operator then removes the work piece by turning it to clear the stud 16 from the retaining roll 23, displacing its upper end outward clear of bracket 30, and lifting it away from the spindle.

This combination enables the work piece to be placed in accurate and secure connection with the work spindle, and removed therefrom with a minimum of effort and care on the part of the operator, and rapidly. It permits the work spindle to be moved in and out through the short distance needed for backing off to clear the cutter during non cutting strokes, by virtue of the flexible engagement of the remote end of the work piece with the centering and hold-down means.

The principles of the work holding means here described can be applied to machines in which the work spindle is stationary (in the sense of having no planetary movement) by mounting the centering and hold-down means on a stationary part of the machine structure and providing a movable cam device for actuating the hold-down lever at proper times in the cycle of the machine.

What I claim is:

1. In a machine tool, a supporting structure, a rotatable work spindle supported thereby adapted to engage one end of a work piece, a spring pressed hold-down device disposed at a distance from the spindle along the axis thereof arranged to exert force toward the spindle on a work piece interposed between the spindle and said hold-down device, said device being held against movement relative to the rotation of said work spindle and having means thereon with rotative engagement against said work piece and means for transmitting rotation from the spindle to a work piece so engaged with the spindle and hold-down device.

2. The combination with a rotatable work spindle and means for transmitting rotation therefrom to a work piece engaged therewith, of an end thrust member located at a distance from the spindle lengthwise of the axis thereof having engaging means adapted to bear on a work piece and being movable so as to carry such engaging means toward and away from the spindle, resilient means acting on said end thrust member to exert force toward the spindle, and automatic means for displacing said end thrust member against the force of said spring.

3. The combination with a rotatable work spindle and means for transmitting rotation therefrom to a work piece engaged therewith, of an end thrust member located at a distance from the spindle lengthwise of the axis thereof having engaging means adapted to bear on a work piece and being movable so as to carry such engaging means toward and away from the spindle, resilient means acting on said end thrust member to exert force toward the spindle, and work centering means adjacent to said end thrust member having two engaging elements spaced apart around the axis of the spindle, and a third engaging element at the opposite side of such axis from the space between the first named element, the last named element being displaceable between the work engaging position and an inoperative position, and being spring controlled to remain in either position until displaced by lateral force.

4. In a machine tool, a rotatable work spindle having a center for engaging one end of a work piece and a stud at one side of such center revoluble around the axis of the spindle, a dog adapted to be secured to a work piece and having a laterally projecting stud disposed to bear on the spindle-carried stud when a work piece carrying the dog is engaged and alined with the spindle, a retainer carried by the spindle disposed to engage the last named stud at a point displaced from the first named stud when the two studs are in contact, means spaced apart axially from the spindle for engaging the work piece at a remote point and resiliently actuated to exert force on the work piece toward the spindle, and work centering means arranged to bear on the work piece at a plurality of points distributed about the axis of the spindle in a location axially displaced from the spindle.

5. In a machine tool, a work spindle having means at its axis for supporting a work piece, a driving stud mounted on the spindle at one side of its axis, and a yieldingly actuated dog retainer mounted on the spindle disposed near the stud in a position such that a driving dog carried by a work piece may enter between it and the stud, and being operable to hold such dog in contact with the stud.

6. In a machine tool, a work spindle having means at its center for supporting a work piece, a driving stud on the spindle at one side of the axis, a lever mounted pivotally on the spindle adjacent to said stud, a projection carried by said lever spaced apart from the stud tangentially of the spindle axis and at nearly the same radial distance from the axis, and a spring engaged with said lever; said projection and stud being arranged to admit a driven member between them and the spring being disposed to cause the projection to press on such a driven member and hold it in contact with the driving stud.

7. In a machine tool, the combination with a work spindle adapted to engage one end of a work piece and an end thrust member arranged to bear on such work piece at a location axially displaced from the spindle to exert force on the work piece toward the spindle, of work centering means comprising a bracket, relatively stationary centering rolls mounted on said bracket with a space between them at one side of the axis of the spindle, a lever pivoted to said bracket having arms extending to different sides of its pivot, a third contact roll on one of the arms of said lever and being placeable by movement of the lever into an operative position at the opposite side of the spindle axis from the space between the first named rolls and into a laterally displaced position, the other lever arm being disposed to extend at one side of the space embraced by the rolls when the lever is in the said operative position and to extend across said space when the lever is in said displaced position, and a spring interconnected between said lever and bracket arranged to be carried across the pivot axis of the lever when the lever is shifted from either of said positions to the other, so as to exert force tending to retain the lever in each of said positions.

8. In a device of the character described, a rotatable work spindle, a rotatable table on which said work spindle is mounted, means for transmitting rotation from said work spindle to a work piece engaged therewith, an end thrust member fixed in a rotatable carrier located at a distance from the spindle lengthwise of the axis thereof, said end thrust member having engaging means adapted to bear on said work piece and being movable so as to carry said engaging means toward and away from the spindle, a resilient means acting on said end thrust member to exert force toward said work spindle and automatic means for displacing said end thrust member against the force of said resilient means, said automatic means including an abutment member fixed against rotation relative to said rotatable carrier to displace said end thrust member in time with the rotation of said table and carrier.

9. In a device of the character described, a rotatable work spindle, a movable table on which said work spindle is mounted, means for transmitting rotation from said work spindle to a work piece engaged therewith, an end thrust member fixed in a movable carrier located at a distance from the spindle lengthwise of the axis thereof, said end thrust member having engaging means adapted to bear on said work piece and being movable so as to carry said engaging means toward and away from the spindle, a resilient means acting on said end thrust member to exert force toward said work spindle and automatic means for displacing said end thrust member against the force of said resilient means, said automatic means including an abutment member fixed against movement relative to said movable carrier to displace said end thrust member in time with the movement of said table and carrier.

10. In a device of the character described, a rotatable work spindle, a movable table on which said work spindle is mounted, means for transmitting rotation from said work spindle to a work piece engaged therewith, an end thrust member fixed in a movable carrier located at a distance from the spindle lengthwise of the axis thereof, said end thrust member having engaging means adapted to bear on said work piece and being movable so as to carry said engaging means toward and away from the spindle, a means acting on said end thrust member to exert force toward said work spindle and automatic means for displacing said end thrust member against the force of said means, said automatic means including an abutment member fixed against movement relative to said movable carrier to displace said end thrust member in time with the movement of said table and carrier.

11. In a machine tool, the combination with a work spindle adapted to engage one end of the work piece and a thrust member arranged to bear on such work piece at a location axially displaced from the spindle, of a work centering means comprising a bracket, relative stationary bearings mounted on said bracket with a space between them at one side of the axis of the spindle, a lever pivoted to said bracket having arms extending to different sides of its pivot, a third bearing on one of the arms of said lever and being placeable by movement of the lever into operative position at the opposite side of the spindle axis from the space between the first named bearings and into a laterally displaced position, the other lever arm being disposed to extend to one side of the space embraced by the bearings when the lever is in the said operative position, and to extend across said space when the lever is in said displaced position, and means interconnected between said lever and bracket arranged to carry across the pivot axis of the lever when the lever is shifted from either of said positions to the other, so as to exert force tending to retain the lever in either of said positions.

EDWARD W. MILLER.

References Cited in the file of this patent

UNITED STATES PATENTS

| Number | Name | Date |
|---|---|---|
| 135,218 | Greenough | Jan. 28, 1873 |
| 1,401,131 | Blackburn | Dec. 27, 1921 |
| 1,655,008 | Braff et al. | Jan. 3, 1928 |
| 1,695,752 | Woytych | Dec. 18, 1928 |
| 1,843,073 | Wagner | Jan. 26, 1932 |
| 1,939,147 | Snyder | Dec. 12, 1933 |
| 1,990,240 | Miller | Feb. 5, 1935 |
| 2,016,482 | Brown | Oct. 8, 1935 |
| 2,029,398 | Sykes | Feb. 4, 1936 |
| 2,250,631 | Groene et al. | July 29, 1941 |
| 2,459,068 | Eastwood | Jan. 11, 1949 |
| 2,463,165 | Felin et al. | Mar. 1, 1949 |

FOREIGN PATENTS

| Number | Country | Date |
|---|---|---|
| 143,060 | Germany | July 31, 1903 |